United States Patent [19]

Walker

[11] 4,269,607
[45] May 26, 1981

[54] AIR-OIL SEPARATOR AND METHOD OF SEPARATION

[76] Inventor: Robert A. Walker, 2240 Sawtelle, Los Angeles, Calif. 90064

[21] Appl. No.: 32,389

[22] Filed: Apr. 23, 1979

Related U.S. Application Data

[63] Continuation of Ser. No. 848,903, Nov. 7, 1977, abandoned.

[51] Int. Cl.³ .................. B01D 45/12; B01D 45/06; B01D 50/00; F01M 13/04
[52] U.S. Cl. .................................. 55/1; 55/319; 55/330; 55/337; 55/385 B; 55/419; 55/DIG. 28; 123/573
[58] Field of Search ............................ 55/97, 184–186, 55/189, 190, 201, 204, 319, 320, 323, 329, 330, 331, 337, 385 B, 419, 462, DIG. 28, 459 R, 1; 123/41.86, 119 B, 573

[56] References Cited

U.S. PATENT DOCUMENTS

| 375,463 | 12/1887 | Stratton | 55/459 R |
|---|---|---|---|
| 1,177,262 | 3/1916 | O'Donnell | 55/319 |
| 2,467,408 | 4/1949 | Semon | 55/330 |
| 2,493,617 | 1/1950 | Chubbuck | 123/119 B |
| 2,762,451 | 9/1956 | McNeil | 55/204 |
| 3,030,942 | 4/1962 | Thompson | 123/119 B |
| 3,175,546 | 3/1965 | Roper | 123/119 B |
| 3,246,639 | 4/1966 | Oliver | 123/119 B |
| 3,378,993 | 4/1968 | Veres et al. | 55/337 |
| 3,382,651 | 5/1968 | Hahl et al. | 55/337 |
| 3,408,828 | 11/1968 | Soumerai et al. | 55/320 |
| 3,418,789 | 12/1968 | Hoffman et al. | 55/337 |
| 3,585,976 | 6/1971 | Rider | 123/119 B |
| 3,721,069 | 3/1973 | Walker | 55/319 |
| 3,779,221 | 12/1973 | Gartner | 123/119 B |
| 4,136,650 | 1/1979 | Manookian, Jr. | 123/119 B |

FOREIGN PATENT DOCUMENTS

| 1172798 | 6/1964 | Fed. Rep. of Germany | 55/320 |
|---|---|---|---|
| 2201877 | 7/1973 | Fed. Rep. of Germany | 123/119 B |

Primary Examiner—David L. Lacey
Attorney, Agent, or Firm—Christie, Parker & Hale

[57] ABSTRACT

An air-oil separator operating on an updraft principle for use with gasoline and diesel internal combustion engines. The separator includes a housing having an inlet and an outlet located at the upper end of the housing. Air-oil mixtures are introduced into the upper portion of the housing, flow downward with a vortex action, are deflected by a baffle at the bottom of the housing and reverse their flow to enter a conduit extending from the outlet and opening into the interior of the housing at a point near the baffle. The inlet has a smaller cross-sectional area than the outlet producing a reduction in pressure of the air-oil mixture. The reduction of pressure, vortex action, deflection and flow path reversal cause oil and contaminants in the stream to be deposited at the bottom of the housing where they are removed by means of a drain.

10 Claims, 5 Drawing Figures

AIR-OIL SEPARATOR AND METHOD OF SEPARATION

CROSS REFERENCE TO RELATED APPLICATIONS

This is a continuation of application Ser. No. 848,903, filed Nov. 7, 1977 now abandoned.

DESCRIPTION OF THE PRIOR ART

The present invention relates to air-oil separators, and in particular to an air-oil separator operating on an updraft principle specifically adapted for use in automotive applications.

Separators for air-oil mixtures have been known and used on internal combustion engines in both automotive and aviation applications for a considerable period of time. Results of the use of such devices, particularly in automotive applications, have been unsatisfactory for the reason that the devices did not effectively remove oil from an air stream entering the device and their performance degraded rapidly due to the build-up of sludge and contaminates on the components or working parts of the apparatus.

In aviation applications, air-oil separators have had a similar fate until the introduction of the air-oil separator described in U.S. Pat. No. 3,721,069, issued to the inventor of the present invention. The separator according to that patent introduced the principle of pressure reduction of the mixture introduced into the separator to enhance and improve the separation capabilities of the unit. The device described in U.S. Pat. No. 3,721,069 provided for a housing having an inlet at the top and an outlet at the bottom with the flow path of the air-oil mixture having a double reversal in the course of flow through the unit. In addition, a baffle was provided near the top upon which the incoming air-oil mixture impinged and filtration material was located below the baffle through which the air-oil mixture flowed in the flow path from inlet to outlet.

It has now been found that, by means of modification of the air-oil mixture separator of U.S. Pat. No. 3,721,069, a unit having a very satisfactory performance on internal combustion engines of all types, stationary as well as automotive, is obtained. Whereas the unit of U.S. Pat. No. 3,721,069 utilized a double reversal of the flow path from inlet to outlet, the unit of the present invention operates on the principle of a single reversal of the flow from the inlet to the outlet by locating the inlet and outlet at essentially the same end of the unit. By providing the inlet and outlet at the top of the unit, air-oil mixtures introduced into the unit flow downwardly and then upwardly producing an "updraft" version of the prior air-oil separator. The result is a unit which is smaller, utilizes fewer parts, does not require the use of filtration material, is simpler and more economical to manufacture. In terms of performance, the present invention makes it possible to save significant quantities of engine oil, particularly in diesel engines, reduce engine emissions, improve engine performance and mileage and reduce engine wear.

SUMMARY OF THE PRESENT INVENTION

The present invention provides an apparatus for separating oil and contaminants from air-oil contaminant mixtures from the crankcase of an internal combustion engine. The apparatus comprises a housing and an intake inlet conduit of a first cross-sectional area which communicates with the interior of the housing at a first end thereof. An exhaust outlet conduit of a second cross-sectional area greater than the first cross-sectional area communicates with the interior of the housing and the outlet conduit is located at the first end of the housing whereby the gas pressure of said mixtures admitted into the unit is reduced in the flow from the inlet to the outlet conduit. The outlet conduit extends from the exterior into the interior of the housing a substantial distance from the first end toward an end of the housing opposite said first end and a baffle is located between the opposite end of the housing and the inlet conduit in the interior of the housing in the flow path of the mixtures from the inlet conduit to the outlet conduit for deflecting the mixtures flowing from the inlet conduit through the housing to alter the direction of flow whereby the mixtures pass into and through the outlet conduit to the exterior of the housing. A mandrel is providing having a mesh configuration extending between the interior open end of the outlet conduit and the baffle and filtration material is coaxially disposed about the mandrel and the outlet conduit and interposed in the flow path from the inlet conduit to the outlet conduit. Finally, drain means is provided which are located at the opposite end for removing oil and contaminants deposited in the opposite end whereby crankcase emissions from the internal combustion engine directed through the apparatus have oil, sludge and particulate matter removed therefrom prior to reintroduction into the engine through a positive crankcase ventilation system.

The invention also contemplates the method of using an air-oil separator as a smog control device for internal combustion engines, by removing contaminants from an emission stream from the crankcase of an internal combustion engine. The method includes the steps of transmitting the emission stream from an internal combustion engine to the inlet to an air-oil separator having an inlet conduit of a first cross-sectional area and an outlet conduit of a second cross-sectional area greater than the first cross-sectional area, both conduits being located at the same end of the housing. The ambient pressure of the emission stream is reduced in the course of flow through the separator by flowing the emission stream from the smaller inlet conduit to the larger outlet conduit. The direction of flow of the emission stream through the separator is reversed only once in the course of flow from the inlet conduit to the outlet conduit to exhaust the stream from the separator at the same end thereof at which the emission stream is introduced and the flow of the emission stream is directed through the separator from the inlet conduit to the outlet conduit so as to cause the emission stream to contact interior surfaces within the housing whereby pollutants and particulate matter in the emission stream are entrained and deposited in the separator.

Utilization of an air-oil separator in this application has the important function of preventing pollutants, contaminants and vapors from being communicated through the positive crankcase ventilation valve (PCV) through the induction system and again into the engine. In this way, by filtering the emissions from the crankcase by means of an air-oil separator, the pollutants, contaminants and particulate matter are deposited in the separator and only air or vapor is communicated to the inlet side of the engine. As a result, the various mechanical parts of the engine, such as the guides, pistons, rings and other moving engine parts are subject to greatly reduced amounts of particulate matter, sludge, etc., and hence, are not scored or plugged up. The engine runs cleaner, freer and cooler, while significantly better mileage is obtained. The present invention also effects a significant reduction in exhaust emissions from a conventional automotive engine without other further modification of the engine and works particularly well in conjunction with modern engines which are equipped with the now mandatory positive crankcase ventilation equipment.

DESCRIPTION OF THE DRAWINGS

These and other advantages of the invention will be better understood by reference to the figures of the drawing wherein.

DESCRIPTION OF A SPECIFIC EMBODIMENT

Figure 1:
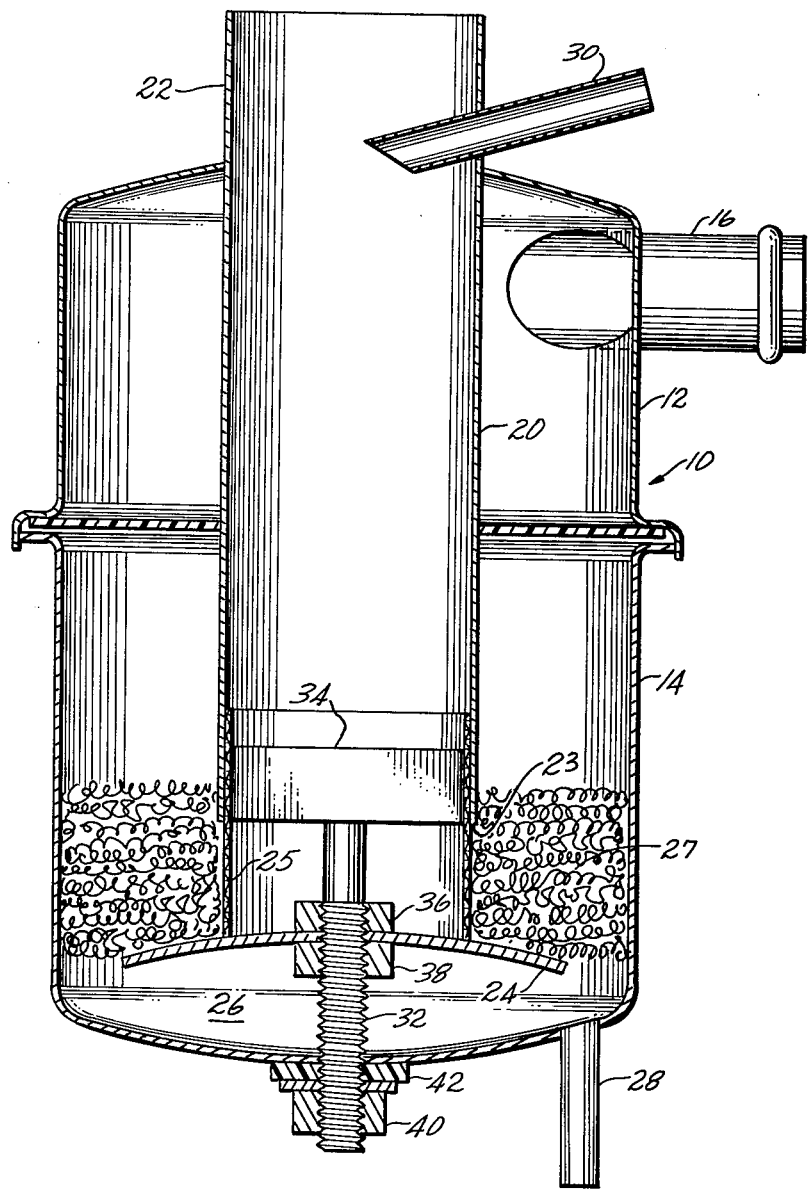
FIG. 1 is a front elevational view in section of air-oil separator according to the present invention for use with gasoline engines.
Figure 2:
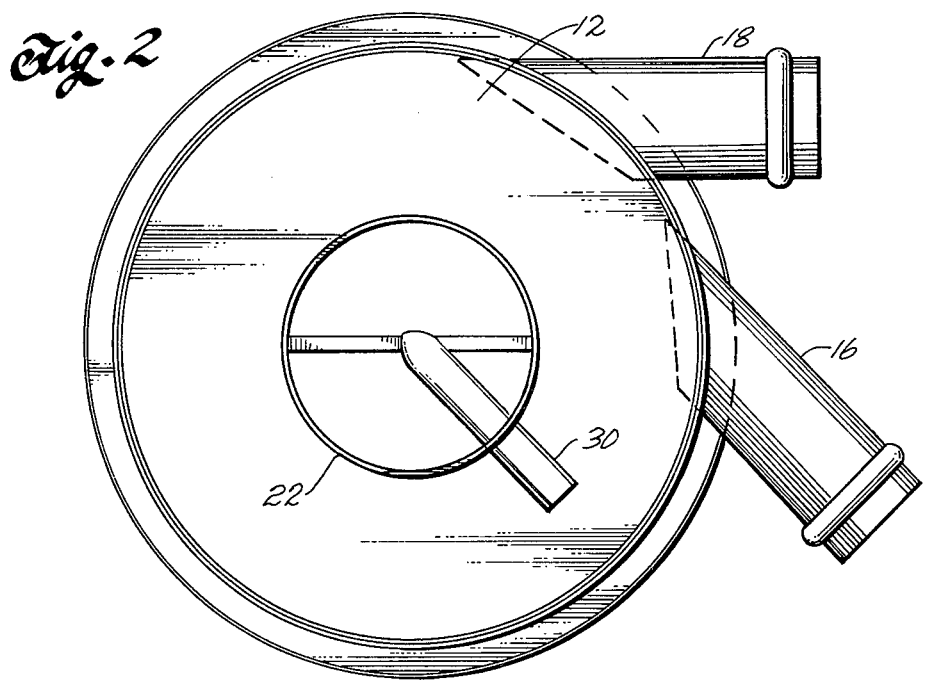
FIG. 2 is plan view of the separator of FIG. 1.

An air-oil separator according to the present invention for use with gasoline engines is shown in FIGS. 1 and 2. As seen from the sectional view of FIG. 1, it comprises a housing 10 having an upper portion 12 and a lower portion 14. Two inlets 16 and 18 are provided in top portion 12 near the upper end thereof for communicating air-oil-contaminant mixtures from a gasoline internal combustion engine to the interior of the housing. A conduit 20 is coaxially disposed within the interior of the housing and extends a substantial distance through the length of the housing. Conduit 20 has an outlet 22 located above the top of top portion 12 and at its opposite end 23 opens into the interior of the housing adjacent a baffle 24 located in bottom portion 14. A wire mesh cylindrical mandrel 25 is secured to the conduit 20 and extends from the interior thereof past end 23 and terminates at baffle 24. A ring of filter material 27 surrounds mandrel 25 and fills the space between the interior wall of bottom portion 14 and the mandrel.

In the presently preferred embodiment, the filter material is a continuous single strand or filament of stainless steel twisted and coild about its longitudinal axis and thereafter wound about the mandrel 25 to produce the ring or doughnut shape. The mandrel forms and supports the wound filter material. Filter material 27 is disposed in the flow path of air-oil-contaminant mixtures from inlet to outlet. As the air-oil mixtures come in contact with the housing interior, the conduit exterior and the filter material, the oil is deposited on and flows along the surfaces thereof toward a collection reservoir 26 at the base of bottom end 14. The air stream passes through the filter material and the mesh of the mandrel and into the conduit to the outlet.

Mandrel 25 forms the filament into its doughnut shape and retains it in that configuration against a tendency of the wound filament to contract because of the spring tension inherent in the twisted filament. Contact of the filament material with end 23 of conduit 20 provides a continuous path of flow for deposited oil preventing the flowing air from picking up oil draining along the exterior of conduit 20, particularly that which tends to collect at end 23 and carrying it up the conduit to the outlet. The contact between mandrel and conduit and between filament, mandrel and baffle performs a similar function.

The flow path of air-oil contaminants through the inlets 16 and 18 is in a generally circular or vortex pattern downwardly toward the bottom of housing 10 until deflected by baffle 24 and bottom portion 14 and directed upwardly through conduit 20 to outlet 22. As seen from FIG. 2, inlets 16 and 18 are oriented generally tangential to the cylindrical housing 10 to encourage and enhance the vortex flow pattern. Conduit 20 and outlet 22 have a cross-sectional area substantially larger than the cross-sectional area of inlets 16 and 18 to effect a pressure reduction in the ambient pressure of the air-oil mixture introduced into the interior of the housing. A ratio of outlet to inlet cross-sectional areas of at least two to one (2:1) has been found to be desirable to effect the desired reduction in pressure. The vortical flow path downward and then upward, the reduction in pressure and the contact with the surfaces of the various components of the separator cause the oil carried in the mixture to be deposited on the component surfaces and drain downwardly into reservoir 26 in the bottom portion 14. A drain 28 communicates with reservoir 26 for permitting the oil and other contaminants collected in the reservoir to be drained from the unit and carried back to the engine oil supply system for filtration and reuse in the engine.

The air issuing from outlet 22 is essentially contaminant-free and in one embodiment is connected to the engine air filter for reintroduction into the carburetor. An auxiliary outlet 30 communicates with the interior of outlet 22 and is provided for communicating a portion of the airstream emanating from the unit to the conventional positive crankcase ventilation valve (PCV) which is provided on most automobile and truck gasoline engines currently in use The assembly of the separator of the present invention also includes a threaded bolt 32 extending through bottom portion 14 to a rigid strap 34 which is rigidly secured to bolt 32. The ends of strap 34 are secured to the interior of conduit 20 and thereby support and hold bolt 32 in position. Top portion 12, conduit 20, bolt 32 and strap 34 are all rigidly secured together to form one integral unit. Baffle 24 is mounted on bolt 32 and held in position by a pair of threaded nuts 36, 38. Bottom portion 14 of the housing is secured to the housing by mounting on bolt 32 and held in position by a nut 40 and washer 42. Mandrel 25 rests upon and is supported by baffle 24.

Figure 3:
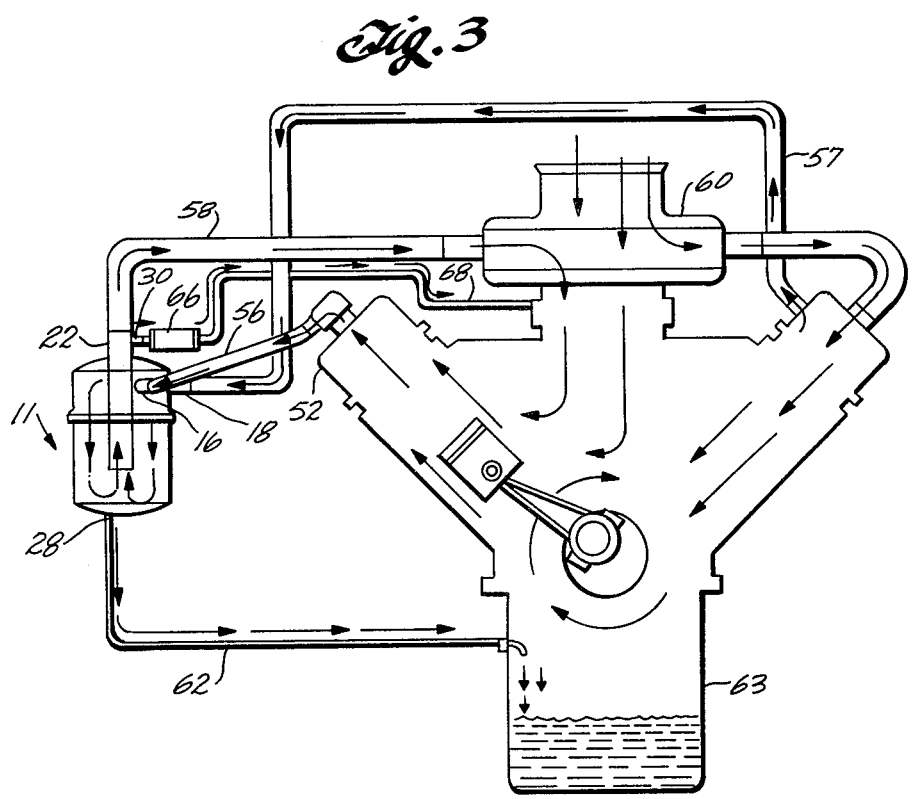
FIG. 3 is a schematic diagram, partially in section, of an internal combustion engine utilizing the air-oil separator according to the present invention.

Use of the separator 11 according to the present invention with an internal combustion engine is shown in FIG. 3, a sectional diagrammatic illustration of an internal combustion engine, with the air-oil separator of the present invention attached. As shown therein, the inlets 16, 18 are connected to the rocker arm covers 52 of an internal combustion engine such as used in automobiles and trucks. Crankcase vapors and air-oil-contaminant mixtures from the engine are communicated by lines 56, 57 to the inlets of the separator and follow the path shown in FIG. 3 through the separator emanating from outlet 22 where a line 58 connected from the outlet communicates the air issuing from the separator to the air filter 60 of the engine. The air from the separator is mixed with fresh air drawn into the air filter and is drawn into the carburetor for mixture in the proportionate amount with the vaporized gasoline. The oil drain 28 is connected by means of a return line 62 to the crankcase 63 where the oil circulation and filtration system of the engine conditions the separated oil for reuse in the engine. Auxiliary outlet 30 from the separator is connected to the PCV valve 66. From the outlet of the PCV valve, a line 68 communicates the air from the valve to the intake manifold where it is reintroduced into the engine along with the air-gas mixture from the carburetor for combustion in the cylinders.

By first flushing the air, hydrocarbon vapors, oil, pollutants and contaminants issuing from the crankcase and normally passed by the PCV valve back into the engine through the separator 11, a substantial reduction in the amount of oil, pollutants, and contaminants communicated to the PCV valve is achieved by the separator and likewise, significant reduction in the amount of such mateials being reintroduced into the engine by the positive crankcase ventilation system. The result is a substantial reduction in the wear and tear on the engine due to the reintroduction of pollutants, particularly particulate matter which can be a significant source of wear on the moving parts of the engine. In addition, the provision of a closed system for reintroducing the hydrocarbon fuel vapors from the crankcase back into the engine through the carburetor and PCV valve produces a significant improvement in gas mileage. The net result is a cleaner burning engine with better gas mileage, less wear and tear, and reduced maintenance cost.

The separator according to the present invention is equally adaptable to use with other internal combustion engines, such as diesel engines, and is particularly effective in providing oil savings and pollution reduction in connection with the operation of such engines and with stationary internal combustion engines, such as motor-generator sets and the like.

A substantial problem inherent in the operation of diesel engines is the blow-by and loss of significant quantities of engine oil. By connecting the air-oil separator of the present invention to the engine vents and the crankcase, a mechanism for recovery of such oil is provided. On turbo-charged diesel engines, the air-oil separator is provided with auxiliary inlets for connection to the outlets from the air boxes of the turbo-charger to provide a mechanism for separating the oil and particulate matter emitted from the air box drains. In tests, it has been found that the use of the air-oil separator of the present invention cuts oil consumption of diesel engines by in excess of 50%, and at the same time, cuts vehicle maintenance costs significantly. This is achieved by a substantial reduction in the number of oil changes required and at the same time the operation of such engines is made significantly cleaner. Increased engine power and fuel economy are also obtained.

When used in conjunction with vehicles which are subject to emission controls, the air-oil separator of the present invention eliminates the major cause of combustion chamber contamination as well as the cause of PCV valve clogging. Reduction of such contamination increases spark plug life, reduces engine operating temperatures, and permits adjustment to optimum engine timing. By enabling a return to optimum engine timing, more complete combustion of the fuel mixture in the cylinder is obtained and thereby a signficant reduction in exhaust emission contaminants results, particularly in low-speed, high-vacuum periods of engine operation.

Figure 5:
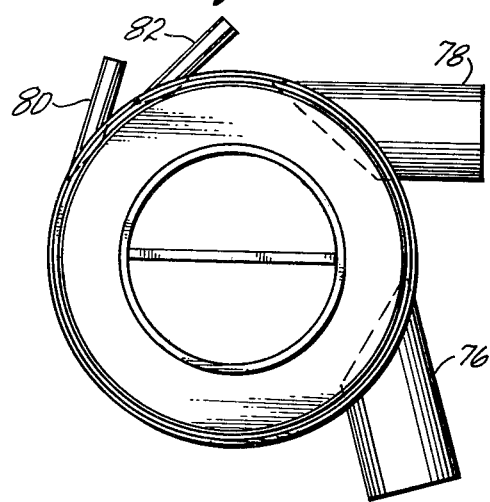
FIG. 5 is a plan view of the separator of FIG. 4.
Figure 4:
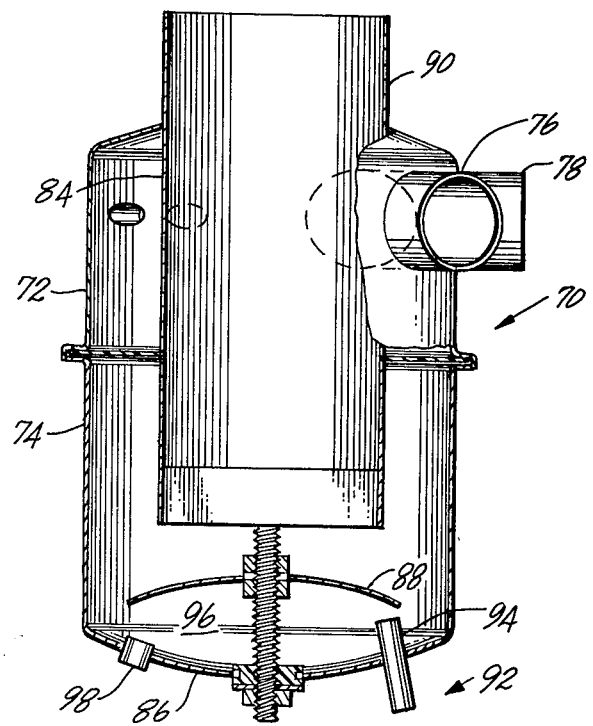
FIG. 4 is a front elevational view in section of an alternate embodiment of the air-oil separator of the present invention for use with diesel engines.

An air-oil separator intended for use with a diesel engine is shown in FIGS. 4 and 5. As shown therein, the separator 70 comprises an upper portion 72 and a lower portion 74. The unit has four inlets, two primary inlets 76 and 78 which are connected to the crankcase vents on the diesel engine. Two additional auxiliary inlets 80 and 82 are also shown. Auxiliary inlets 80, 82 are connected to the outlets from the air boxes on a turbocharged diesel engine. As is illustrated in FIG. 5, the orientation of the units is such that air-oil-contaminant mixtures flowing into the inlets enter tangentially to provide a vortical flow around a central conduit 84 into bottom portion 74. As before, the mixtures encounter the bottom 86 of separator 70 and a baffle 88 and are thereby deflected upwardly into the interior of the conduit 84 and thence through its outlet 90 thereby exhausted from the separator.

For illustration purposes, the mandrel and filter material shown in the unit of FIGS. 1 and 2 are not utilized in the unit of FIGS. 4 and 5. In the presently preferred embodiment of the separator for use with diesel engines, both the mandrel and the filter material are included. Nevertheless, the separator of the present invention has been found to perform quite satisfactorily without the inclusion of such elements.

A drain 92 having a higher stand pipe 94 extending into the interior of the separator communicates between the interior and the exterior of the separator through bottom 86. It has been found that when the unit of the present invention is used with diesel engines, particularly ones in which are box outlets are connected to inlets 80,82, granular particulate matter is also introduced into the separator and separated and deposited in reservoir 96 at the bottom of the unit. The increased elevation of stand pipe 94 prevents the particulate matter from flowing into the drain and being carried back to the oil filtration system of the engine. Baffle 88, overlapping the inlet to stand pipe 94, likewise deters particulate matter from entering the drain or from clogging the opening to stand pipe 94. A clean-out plug 98 is shown in the bottom of the unit for periodically servicing the unit to remove sludge and particulate matter deposited in reservoir 96.

Use of the air-oil separator of the present invention on a diesel engine provides a mechanism whereby the engines of this type can be operated on the basis of a closed system, as are gasoline engines presently used in automobiles. Thus, the air-oil separator when used with diesel engines provides a means for recycling crankcase emissions after oil, contaminants and pollutants have been eliminated therefrom back into the engine, significantly reducing the emissions from such engines. Because a significant amount of blow-by of fuel mixtures is inherent in the operation of diesel engines, the capturing and recycling of diesel engine crankcase emissions provides a means whereby hydrocarbon vapors are recycled back into the engine to effect significant fuel savings.

Whether applied to gasoline or diesel engines, the air-oil separator of the present invention operates on the principle of separating the oil and causing deposition on the surfaces of the separator by means of pressure reduction of the mixtures entering the separator from the engine, deflection of the mixtures as they flow through the unit, deposition due to the effect of gravity, particularly in the reversal of the flow of the mixtures at the time of entry into the conduit communicating with the outlet, and finally the vortical action. Each effect contributes independently and jointly in the separation and filtration obtained. The pressure reduction effect of the air-oil separator is further enhanced when the separator is utilized on an engine equipped with a PCV valve. When the PCV valve opens during engine operation, the engine vacuum is communicated to the outlet from the separator through the PCV valve, thereby providing a further reduction in pressure at the outlet and an even greater differential in the pressure between the inlet and the outlet of the separator.

By providing a means for reducing the amount of sludge and particulate matter reintroduced into the engine in closed engine systems, the operation of such engines is substantially improved causing the engine to remain clean for significantly longer periods and thereby substantially improving engine breathing. As a result, increased power and fuel economy is obtained.

What is claimed is:

1. An apparatus for separating oil and contaminants from air-oil contaminant mixtures from the crankcase of an internal combustion engine comprising:
    a housing;
    an intake inlet conduit of a first cross-sectional area communicating with the interior of the housing at a first end thereof;
    an exhaust outlet conduit of a second cross-sectional area greater than said first cross-sectional area communicating with the interior of the housing, said outlet conduit being located at said first end of the housing whereby the gas pressure of said mixtures admitted into the unit is reduced in the flow from said inlet conduit to said outlet conduit;
    said outlet conduit extending from the exterior into the interior of the housing a substantial distance from said first end toward an end of the housing opposite said first end;
    a baffle located between said opposite end of the housing and the inlet conduit in the interior of the housing in the flow path of said mixtures from said inlet conduit to said outlet conduit for deflecting the mixtures flowing from said inlet conduit through the housing to alter the direction of flow whereby the mixtures pass into and through said outlet conduit to the exterior of the housing;
    a mandrel having a mesh configuration extending between the interior open end of said outlet conduit and said baffle;
    filtration material coaxially disposed about said mandrel and said outlet conduit and interposed in the flow path from said inlet conduit to said outlet conduit; and
    drain means located at said opposite end for removing oil and contaminants deposited in said opposite end whereby crankcase emissions from the internal combustion engine directed through the apparatus have oil, sludge and particulate matter removed therefrom prior to reintroduction into the engine through a positive crankcase ventilation system.

2. An apparatus according to claim 1 wherein the filtration material is disposed about the mandrel.

3. An apparatus according to claim 2 wherein the filtration material extends between and is in contact with the exterior surface of the mandrel and the interior surface of the housing.

4. An apparatus according to claim 3 wherein the filtration material extends between and is in contact with the interior open end of the outlet conduit and the baffle.

5. An apparatus according to claim 4 including a plurality of said intake inlet conduits for connection to a corresponding number of emission sources from an internal combustion engine.

6. An apparatus according to claim 5 including an auxiliary outlet from the housing adapted for connection to said engine.

7. An apparatus according to claim 1 wherein the ratio of the cross-sectional area of the outlet conduit to the cross-sectional area of the inlet conduit is at least two to one (2:1).

8. A method of removing contaminants from an emission stream from the crankcase of an internal combustion engine comprising the steps of:
    (1) transmitting the emission stream from an internal combustion engine to the inlet to an air-oil separator having an inlet conduit of a first cross-sectional area and an outlet conduit of a second cross-sectional area greater than said first cross-sectional area, said conduits being located at the same end of the housing;
    (2) reducing the ambient pressure of the emission stream in the course of flow through the separator by flowing the emission stream from the smaller inlet conduit to the larger outlet conduit;
    (3) reversing the direction of flow of said emission stream through the separator only once in the course of flow from inlet conduit to outlet conduit to exhaust the stream from the separator at the same end thereof at which the emission stream was introduced; and
    (4) directing the flow of the emission stream through the separator from inlet conduit to outlet conduit so as to cause the emission stream to contact interior surfaces within the housing whereby pollutants and particulate matter in the emission stream are entrained and deposited in the separator.

9. The method according to claim 8 wherein the step of transmitting the emission stream includes the step of introducing the emission stream into the separator tangentially to create a vortical flow pattern through the separator.

10. The method according to claim 9 wherein the reversing step includes the steps of directing the vortical flow of the emission stream longitudinally through a substantial portion of the length of the separator, deflecting the flow of the emission stream to change the direction of flow and thereafter directing the flow of the emission stream through an interior conduit of the separator in the reverse of the first direction of flow.

* * * * *